(12) United States Patent
Gervais

(10) Patent No.: US 6,217,646 B1
(45) Date of Patent: Apr. 17, 2001

(54) SCULPTABLE AND BREATHABLE WALL COATING MORTAR COMPOUND

(75) Inventor: Richard Gervais, Dollard-des-Ormeaux (CA)

(73) Assignee: Daubois Inc., Montreal (CA)

( * ) Notice: Subject to any disclaimer, the term of this patent is extended or adjusted under 35 U.S.C. 154(b) by 0 days.

(21) Appl. No.: 09/298,942

(22) Filed: Apr. 26, 1999

(51) Int. Cl.$^7$ .............................. C04B 7/02; C04B 14/22; C04B 24/24
(52) U.S. Cl. ......................... 106/724; 106/716; 106/730; 106/676
(58) Field of Search .................................. 106/724, 716, 106/730, 676

(56) References Cited

U.S. PATENT DOCUMENTS

| | | | |
|---|---|---|---|
| 3,023,116 | 2/1962 | Alford et al. | 106/676 |
| 3,362,837 | 1/1968 | Walker et al. | 106/676 |
| 3,936,311 | * 2/1976 | Kirst et al. | 524/5 |
| 3,989,534 | 11/1976 | Plunguian et al. | 106/646 |
| 4,391,647 | 7/1983 | Deer et al. | 523/218 |
| 5,009,269 | * 4/1991 | Moran et al. | 166/293 |
| 5,362,320 | * 11/1994 | Whatcott | 106/709 |

FOREIGN PATENT DOCUMENTS 54-135418 * 10/1979 (JP).
59-146960 * 8/1984 (JP).

OTHER PUBLICATIONS

Chemical Abstract No. 89:64066, abstract of Soviet Union Patent Specification No. 607816 (May 1978).*
Chemical Abstract No. 89:203033, abstract of German Patent Specification No. 2703342 (Aug. 1978).*
Chemical Abstract No. 90:173629, abstract of Czech. Patent Specification No. 175561 (May 1977).*
Chemical Abstract No. 90:191586, abstract of German Patent Specification No. 2644300 (Apr. 1978).*
Chemical Abstract No. 100:214650, abstract of Soviet Union Patent Specification No. 1070129 (Jan. 1984).*
Derwent Abstrac No. 1979–00707B, abstract of Japanese Patent Specification No. 53–132054 (Nov. 1978).*
Derwent Abstract No. 1987–145419, abstract of Hungarian Patent Specification No. 0001129 (Apr. 1987).*
Derwent Abstract No. 1996–332390, abstract of Korean Patent Specification No. 0013641 (Sep. 1994).*

* cited by examiner

*Primary Examiner*—Anthony Green
(74) *Attorney, Agent, or Firm*—François Martineau

(57) ABSTRACT

A coating mortar compound for pressure spraying over a surface to be levelled. The mortar compound comprises as active ingredients the following three ingredients: a) hydraulic lime, preferably of moderate hydraulicity; b) Portland cement; c) vinyl acetate dry polymer; and further comprising as filler and the main ingredient in weight of the total compound weight the following single ingredient: d) a mineral filler, preferably silica sand. Upon having been sprayed over a surface to be levelled, the mortar compound remains both permeable to water vapors while enabling scupturing thereof even after partial curing thereof. Various additives may be included to enhance the performance of the composition. These optional additives include: hollow glass or ceramic spheres, a defoaming agent, a water retention agent, a rheological aid, a water repellent agent, a water reducing agent, and an accelerator agent.

12 Claims, No Drawings

SCULPTABLE AND BREATHABLE WALL COATING MORTAR COMPOUND

FIELD OF THE INVENTION

This invention relates to a cementitious compound which can be pumped, sprayed or troweled on wall surfaces.

BACKGROUND OF THE INVENTION

It is known to use fresh cementious compounds to apply same over worn out rigid wall surfaces, for resurfacing and/or levelling purposes. These known cementious compounds may be for example troweled by hand over the wall surface, or sprayed thereon by a compressed air gun at the end of a hose connected to a fresh cementious compound tank. However, once cured, these cementious compound having adhered to the wall surface cannot be thereafter surface shaped for aesthetic purposes, since the cement is completely rigid and cannot be hand- or trowel-fashioned for custom made individualized look. In addition, these cementious compounds may have structural weaknesses and/or aesthetically unappealing features brought about by through-borings generated by air bubbles that appeared during wall application and that became accidentally trapped therein during curing.

Examples of such known fresh cementious or cementious-like compounds include the following patents. U.S. Pat. No. 3,989,534, which discloses a cement having the appearance of a foam, which includes Portland cement, a defoaming agent and hollow silicate spherical bodies. U.S. Pat. No. 4,391,647, which discloses a compound to manufacture stucco and plaster joints with a trowel, having a large proportion of hollow silicium particles, mixed to lime. U.S. Pat. No. 3,023,116, which shows an ultralight concrete which is buoyant since it comprises a good quantity of spherical glass particles. U.S. Pat. No. 3,362,837, which discloses a thermally insulating concrete which is non absorbent and which includes Portland cement, sand, gravel and volcanic ash. U.S. Pat. No. 4,494,990, which discloses a cement mixed with gypsum, which is similar to hydraulic lime, but which further comprises accelerating agents to vary the curing time of the compound, and which further comprises a water reducing agent. U.S. Pat. No. 5,009,269, which is a mixture of Portland cement, of a polyvinyl and of calcium sulfate.

OBJECT OF THE INVENTION

The gist of this invention is to improve upon existing add-on cementitious compounds, by providing an economic cementitious composition which is both a breathable, porous mortar which can be sculpted in custom-made fashion following an initial cure.

SUMMARY OF TILE INVENTION

The invention consists of a cementitious mortar compound with the ability of being sprayed or troweled on wall surfaces. The mortar compound comprises as active ingredients the following three ingredients:
 a) hydraulic lime;
 b) Portland cement;
 c) vinyl acetate dry polymer; and further comprising as filler and the main ingredient in weight of the total compound weight the following single ingredient:
 d) a mineral filler; wherein upon having been sprayed over a surface to be levelled, said mortar compound boasts the unexpected result of remaining both permeable to water vapours throughout curing, while enabling scupturing thereof even after a 24 hour last leg curing stage thereof.

Each of said sphere is envisioned to be of the lightweight and hollow type, and of a size which may vary between 70 to 325 mesh (44 to 210 micrometers).

Various additives may be included to enhance the performance of the composition. These additives include:
1. a second filler, selected from the ground comprising glass spheres and ceramic-based spheres, wherein said spheres assist in reducing the overall density of the mortar compound and reduce binder level.
2. a defoaming agent, to assist in controlling the final amount of air on the sprayed compound during curing thereof.
3. a water retention agent (preferably cellulose ether), permitting applications on either high or low absorptive substrates.
4. a rheological aid (preferably polysaccharide) to the compound.
5. a water repellent agent (preferably calcium stearate)
6. a water reducing agent, to reduce the amount of water required while maintaining the plasticity of the mix.
7. an accelerator agent for the portland cement portion of the compound, preferably selected from the group comprising calcium formate and zinc formate.

The respective relative ratios of these ingredients may vary between the following ranges, as percentage in weight of the total compound:
 a) hydraulic lime (preferably of moderate hydraulicity): between 2 and 30%; (preferably 5%)
 b) portland cement: between 4 and 25%; (preferably 10%)
 c) vinyl acetate dry polymer: between 1 to 8% (preferably 5%); and
 d) mineral filler between: 50 to 80% (preferably about 73.33%)
 e) glass/ceramic spheres: between 0 and 30% (preferably 7%)
 f) defoaming agent: between NIL and 0.20% (preferably 0.15%)
 g) water retention agent: between NIL and 0.40% (preferably 0.05%) (preferably methyl cellulose)
 h) rheological aid: between NIL and 0.04% (preferably 0.03%) (preferably polysaccharide)
 i) water repellent agent: ranges between NIL and 0.40% (preferably 0.10%) (preferably calcium stearate)
 j) water reducing agent: between NIL and 0.40% (preferably 0.20%) (preferably ligno sulfanate)
 k) accelerator agent: between NIL and 0.40% (preferably 0.14%) (preferably calcium formate)

For best performance, said mineral filler will be silica sand will have a particle size which may vary between about 16 to 325 mesh (44 to 1190 micrometers), and most preferably about #40 mesh. (420 micrometers).

When the applied mortar has initially cured, it can be sculpted to a limitless array of architectural designs. Once fully cured, it will have the capability of releasing entrapped moisture by transmitting vapors. These vapors will be released at such a rate that entrapped humidity will not damage or not internal structural components.

Conceptually, this specialty mortar would have the ability to be applied on wall surfaces by means of a pump spray unit or by trowel. Equally, this mortar will have a strong bond to most common construction materials. The application must be able to hold its own weight up to 2" in thickness. Once this mortar has cured for approx. 24 hours, it can then be sculpted and designed to specification. Once fully cured, vapors can be released at a fast and efficient rate due to porosity of the dried mortar and the density of the hydraulic binders.

DETAILED DESCRIPTION OF THE INVENTION

The present mortar compound is a veneer coating, which can be applied with a pressurized air spray gun to a wall surface to be levelled in thickness ranging between ½ to 2 inches (1.25 to 5 centimeters) in a single application. This mortar compound will be able to adhere to a variety of quality of wall surfaces, including cement walls and plasterboards. One of its unique properties is that, once the initial cure has been completed, i.e. in about 24 hours, the now rigid coating can still be sculpted or surface trowelled, to achieve a wide range of aesthetically appealing finishes and appearances. This mortar compound has through its microstructure the high capability of transmitting vapours allowing for entrapped moisture to escape and be released to ambient air. This vertical coating is durable for exterior applications and can consequently be good also for interior finishes as well.

The purpose of adding the moderately hydraulic lime ingredient to this mortar compound, is to render the overall matrix weak enough so that the compound can be sculpted or shaped to a desired pattern, being an unexpected and advantageous result. Equally, the fine particle size coupled with a low-density, exhibits excellent vapor transmission or so called "breathability" of the mortar compound. Chemical alternatives of moderately hydraulic (3,5) lime, which are still operational but of lesser efficiency, are as follows:

low hydraulicity (2,0) lime (having an active clay ratio of less than 12%);

high hydraulicity (5,0) lime;(having an active clay ratio extending between 18 and 25%;

high calcium hydrated lime; and dolomic hydrated lime.

The Portland cement is there to strengthen the back bone of the system and permit good impact resistance. Acceptable types of such Portland cement include white portland cement and ordinary portland cement "type 10".

The defoamer, preferably in powder form, serves to control the final level of air in the mix. It is important to maintain the same amount of air throughout compound application and during curing thereof, to maintain uniformity of the product. This defoamer powder is a defoamer and antifoam, typically used already in commerce for dry mix adhesives, paints, plaster compositions, joint compounds, spackles, cement patching and underlayment compositions, thin-set plasters and cement. The present defoamer disperses easily in water, with an alcaline pH (approximately 8.5 to 9). Added to this cementious compound at a percentage per weight varying between 0.10 and 0.40%, this defoamer powder provides good foam control. The optimum amount needed may be readily determined by inspection, according to the following parameters:

the nature and quantity of organic materials present;

the equipment used; and the extent to which the mixture is agitated.

This defoamer powder will enable this cementious compound to wet out faster and more uniformly, while preventing accidental trapping of air bubbles in the wet mixture and thus promoting good troweling operations; it will prevent excessive shrinkage porosity and structural weakness of the set material.

Vinyl acetate, or so-called "vinyl versatate", is a dry copolymer powder resin. Variants thereof may include any one of all homo, pure, or co-polymers in a dry form.

Silica sand is preferably used as the mineral filler. It is possible to have a variety of finishes depending on the particle size selected. Silica sand of crystalline particle size varying between about 44 to 1190 micrometers are envisioned to be of operational range, although an approximately 420 micrometer size would be optimum.

The methyl cellulose acts as a water retention agent, permitting applications on either high or low absorptive substrates. However, any other type of cellulose ethers can be effectively used.

The glass or ceramic spheres add volume and reduce the overall density of the mortar.

Polysaccharide is the preferred rheological aid.

Calcium stearate is the preferred water repellent agent. An alternate type of water repellent agent would be zinc stearate.

The water reducing agent reduces the amount of water required while maintaining the plasticity of the mix. By way of example only, water reducing agents may be selected from those appearing in U.S. Pat. No. 4,494,990 issued in 1985 to Ash Grove Cement Company. The calcium formate acts as an accelerator for the portland cement portion found in the compound.

It has been found during experimental tests conducted by the present applicant, that at intervals of 7 and 28 days, monitoring of compression standards for the present mortar compound has revealed an increase by two thirds of compression strength:

7 days: 9 Mpa 28 days: 15 Mpa

What is claimed is:

1. A coating mortar compound for pressure spraying over a surface to be leveled, said mortar compound comprising as ingredients the following ingredients:

a) hydraulic lime;

b) Portland cement;

c) vinyl acetate resin;

d) a mineral filler; and e) a second filler selected from micrometer grade glass spheres and micrometer grade ceramic-based spheres, wherein said spheres assist in reducing the overall density of the mortar compound and reduce binder level;

all in such relative proportions that upon being sprayed over a surface to be leveled, said mortar compound remains both permeable to water vapors while enabling sculpturing thereof even after partial curing thereof.

2. A mortar compound as in claim 1, wherein the respective relative ratios of said ingredients may vary between the following ranges, as percentage in weight of the total compound:

a) hydraulic lime: between 2 and 30%;

b) Portland cement: between 4 and 25%;

c) vinyl acetate resin: between 1 to 8%;

d) mineral filler: between 50 to 80%; and e) second filler: between 0 and 30%.

3. A mortar compound as in claim 1, wherein each of said micrometer grade spheres is lightweight and hollow, and of a size which may vary between 44 and 210 micrometers.

4. A mortar compound as in claim 1, further including an accelerator agent for the Portland cement of the compound.

5. A mortar compound as in claim 2, wherein the percentage in weight of said ingredients relative to the total compound weight, which are most efficient for optimum performance of the mortar compound, are as follows:
  a) hydraulic lime: 5%
  b) Portland cement: 10%
  c) Vinyl acetate resin: 5%
  d) silica sand as mineral filler: about 73%
  e) glass/ceramic spheres: about 7%.

6. A mortar compound as in claim 2, wherein the percentage in weight of all ingredients relative to the total compound weight, which are most efficient for optimum performance of the mortar compound, are as follows:
  a) hydraulic lime: 5%
  b) portland cement: 10%
  c) vinyl acetate resin: 5%
  d) silica sand as mineral filler: 72.33%
  e) glass/ceramic spheres: 7%:
and further including the following additional ingredients:
  f) a defoaming agent, in a percentage in weight of 0.15% of the total compound weight;
  g) methyl cellulose as a water retention agent, in a percentage in weight of 0.05 of the total compound weight, and permitting applications on absorptive substrates;
  h) polysaccharide as a rheological aid, said polysaccharide constituting a percentage in weight of 0.03 of the total compound weight;
  i) calcium stearate as a water repellent agent, and constituting a percentage in weight of 0.10 of the total compound weight;
  j) a water reducing agent, to reduce the amount of water required while maintaining the plasticity of the compound, said water reducing agent constituting a percentage in weight of 0.20 of the total compound weight;
  k) calcium formate as an accelerator agent for the Portland cement of the compound, said calcium formate constituting a percentage in weight of 0.14 of the total compound weight.

7. A coating mortar compound for pressure spraying over a surface to be leveled, said mortar compound comprising as ingredients the following ingredients:
  a) between 2 and 30% by weight of hydraulic lime;
  b) between 4 and 25% by weight of Portland cement;
  c) between 1 to 8% by weight of vinyl acetate resin;
  d) between 50 to 80% by weight of a mineral filler; and
  e) a defoaming agent, in a percentage in weight between 0 and 0.20 of the total compound weight;
all in such relative proportions that upon being sprayed over a surface to be leveled, said mortar compound remains both permeable to water vapors while enabling sculpturing thereof even after partial curing thereof.

8. A mortar compound as in claim 7, further including cellulose ether as a water retention agent, in a percentage in weight between 0 and 0.40 of the total compound weight, and permitting applications on absorptive substrates.

9. A mortar compound as in claim 7, further including calcium stearate as a water repellent agent, and constituting a percentage in weight between 0 and 0.40 of the total compound weight.

10. A mortar compound as in claim 7, further including a water reducing agent, to reduce the amount of water required while maintaining the plasticity of the compound, said water reducing agent constituting a percentage in weight between 0 and 0.40 of the total compound weight.

11. A mortar compound as in claim 7, further including an accelerator agent for the Portland cement of the compound, said accelerator agent being selected from calcium formate and zinc formate; said accelerator agent constituting a percentage in weight between 0 and 0.40 of the total compound weight.

12. A coating mortar compound, for pressure spraying over a surface to be leveled, said mortar compound comprising as ingredients the following ingredients:
  a) hydraulic lime;
  b) Portland cement;
  c) vinyl acetate resin;
  d) a mineral filler; and
  e) a rheological aid;
all in such relative proportions that upon being sprayed over a surface to be leveled, said mortar compound remains both permeable to water vapors while enabling sculpturing thereof even after partial curing thereof.

* * * * *